(No Model.) 3 Sheets—Sheet 1.
F. M. BOOKWALTER.
HURDY-GURDY WATER WHEEL.
No. 553,097. Patented Jan. 14, 1896.
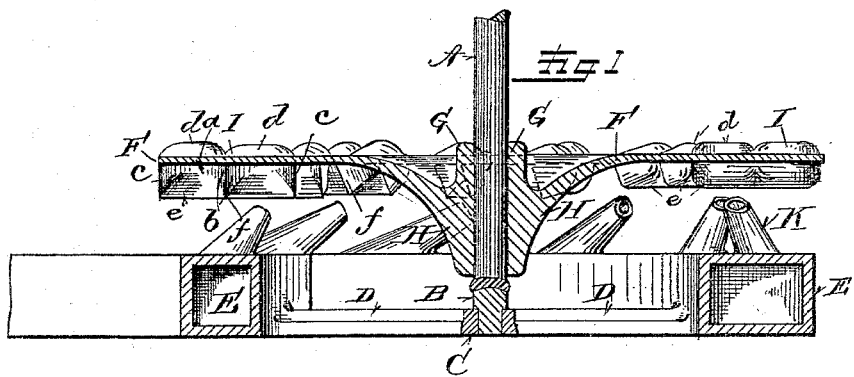
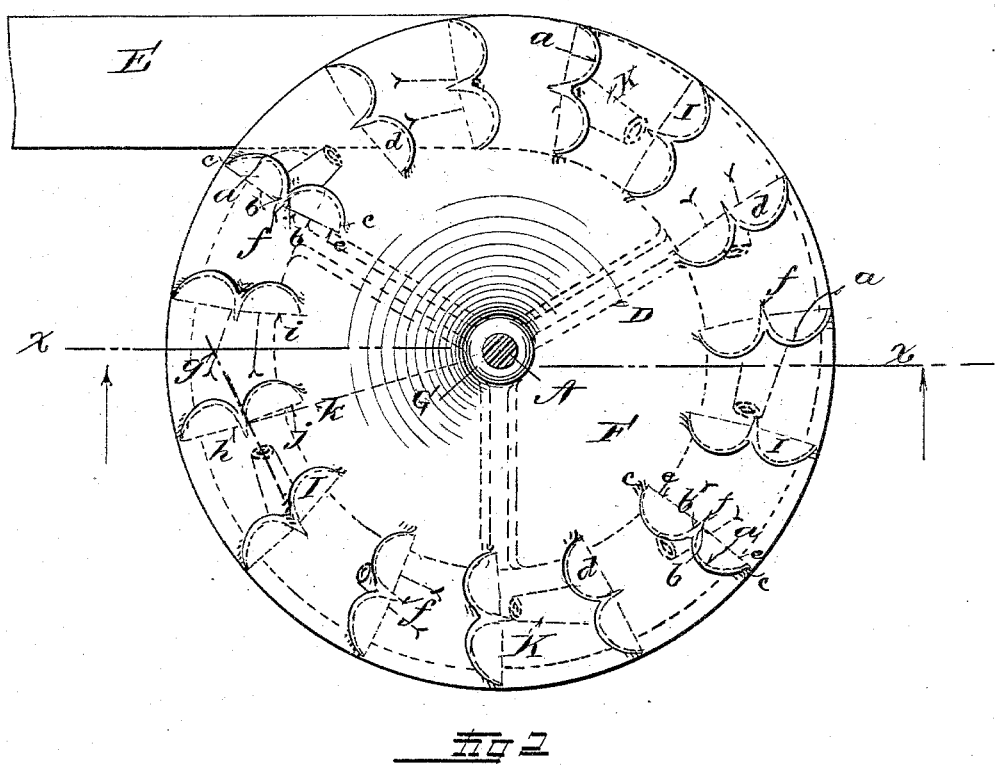
Witnesses
Inventor
Francis M. Bookwalter,
By his Attorney

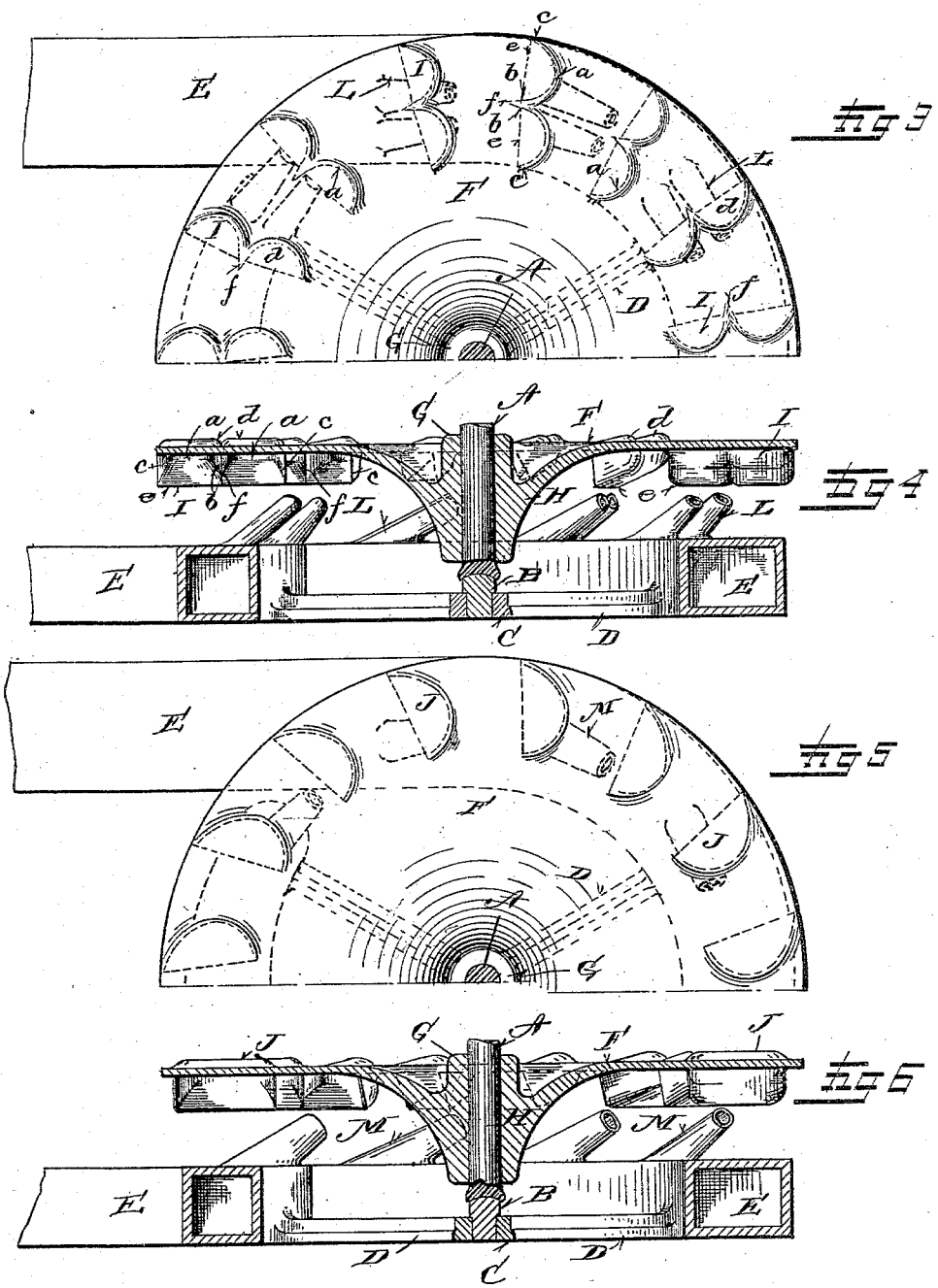

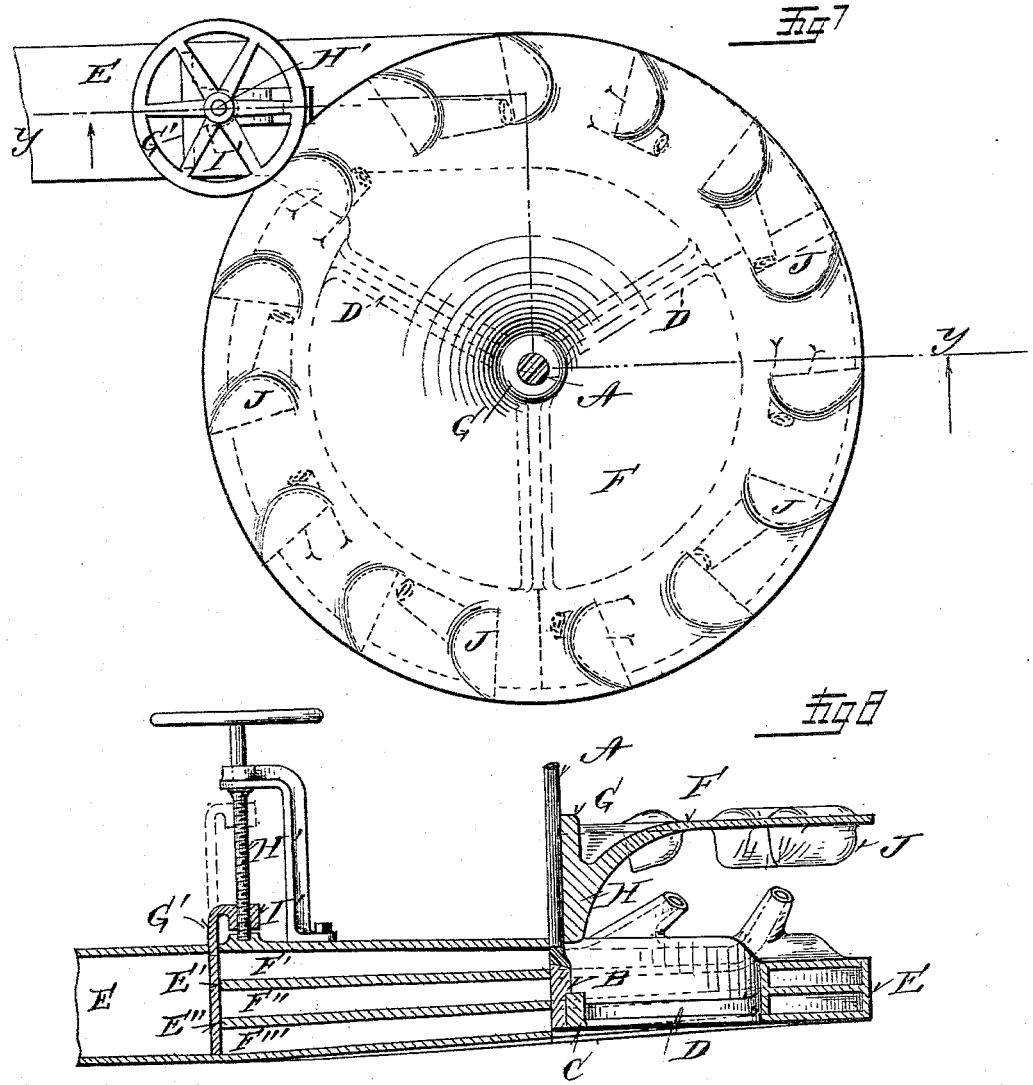

UNITED STATES PATENT OFFICE.

FRANCIS M. BOOKWALTER, OF SPRINGFIELD, OHIO.

HURDY-GURDY WATER-WHEEL.

SPECIFICATION forming part of Letters Patent No. 553,097, dated January 14, 1896.

Application filed February 7, 1895. Serial No. 537,570. (No model.)

*To all whom it may concern:*

Be it known that I, FRANCIS M. BOOKWALTER, a citizen of the United States, residing at Springfield, in the county of Clark and State of Ohio, have invented certain new and useful Improvements in Hurdy-Gurdy Water-Wheels, of which the following is a specification, reference being had therein to the accompanying drawings.

This invention relates to certain new and useful improvements in hurdy-gurdy water-wheels.

The object of my invention is to construct a horizontal hurdy-gurdy water-wheel with the buckets on the lower or ground side of the wheel and to combine therewith one or more water-nozzles arranged below the buckets, the buckets being preferably designed to discharge the water laterally, and the nozzles being preferably in a circular path corresponding substantially with the path in which the water dividing or entering edge of the buckets is located.

My invention also embraces other features which will be hereinafter more fully pointed out and particularly set forth in the claims.

In the accompanying drawings, Figure 1 is a vertical sectional view of my improved water-wheel, the section being taken on the line $x$ $x$ of Fig. 2; Fig. 2 a plan view of the wheel with the buckets, water-troughs, and nozzles shown in dotted lines beneath the plate forming the body of the wheel; Fig. 3, a similar plan view of a portion of the wheel, showing a double series of nozzles; Fig. 4, a vertical sectional view of the form shown in Fig. 3; Fig. 5, a similar plan view to Fig. 3, showing the buckets in single instead of double form; Fig. 6, a vertical sectional view of the form shown in Fig. 5; Fig. 7, a plan view; and Fig. 8 a sectional view on the line $y$ $y$ of Fig 7, showing another form of supply-conduit.

The letter A designates a shaft suitably supported above and mounted at its lower end on a step B supported by the hub C of a spider D connected to the water-trough E. On this shaft is mounted the wheel proper, consisting of a disk F with a hub G and formed on its lower side with a body H curved downward from the plate so as to form a guiding surface to direct downward the inwardly-discharged water escaping from the buckets. Connected to this disk, preferably by being cast in one piece therewith, are the buckets which I have shown in double series I in Figs. 1, 2, 3 and 4, and in single series J, which I have shown in Figs. 5 and 6. In the double-series form I have arranged the nozzles in two forms also—in the single series form K, as shown in Figs. 1 and 2, and in the double-series form, as shown at $l$ in Figs. 3 and 4.

In the single-series form of buckets I have shown the nozzles also in single-series form, as shown at M in Figs. 5 and 6.

Referring now specifically to the double-series form of buckets it will be seen that these buckets are composed of a bottom $a$, with sides $b$ and $c$, converging into the bottom, and of an upper side $d$ and a lower side $e$. It will also be seen that the sides $b$ meet to form a water entering or dividing edge $f$, and that this edge inclines so as to be substantially parallel to the discharge end of the nozzles, or substantially perpendicular to the axis of the nozzles, so as to properly receive the stream of water. By preference the upper sides of the buckets project somewhat above the disk or plate F so as to give the buckets the proper inclination.

The water-trough or supply-conduit E, it will be seen, occupies a position beneath the buckets, and that it is gradually contracted in size or width so that it will carry the proper quantity of water to duly supply all of the nozzles, and yet gradually grow smaller as the remaining nozzles to be filled grow less in number, until finally it is smallest at its inner end near which the last nozzle is located. On the upper side of this trough or conduit I place or secure the nozzles, arranging the single series in Figs. 1 and 2 so that the stream that is discharged from them will first strike the side $b$ of the inner buckets, and will then, as the buckets move past the nozzles, gradually pass over to the outer side of the dividing-ridge, supplying both buckets for a time, and then finally will pass wholly into the outer buckets, which action is due to the fact that the streams are issuing in right lines while the buckets are traveling in a curved line. The dotted line $g$ in Fig. 2 shows the axis of the stream, while the buckets at the point $h$ are just passing into the stream, and at the point $i$ are just passing out of the stream and approaching the point where a moment later the stream of the next nozzle will enter them. Between the points $h$ and $i$ the action of the stream in passing first into the inner buckets, and then into both buckets, and finally into the outer buckets, takes place. Thus the maximum utilization of the stream is accomplished, since from the time the buckets pass within the line of the stream until they pass without that line the stream is always acting on one or both buckets to produce rotation of the wheel. It will further be seen, in a comparison of the edge $j$ of the inner bucket in Fig. 2 with the dotted line $k$, that said edge of the inner bucket is not quite radial, being inclined back from a radial line so as to set the inner discharge-edge of the inner bucket farther forward to facilitate the discharge of the water, owing to the increasing acuteness of the angle between the edge $j$ and the stream as the buckets revolve from each nozzle. From these remarks it will be understood that the water discharges laterally from the buckets. Such is the case. Hence the curved body portion H for the purpose of downwardly directing the water that discharges inward.

The remarks above made as to how the water first entered the inner bucket, then both buckets, then the outer bucket, apply equally to the inner series of nozzles in Figs. 3 and 4; but as to the outer series of nozzles in said figures the action is simply that of the water only playing into the outer series of buckets.

Referring now to the form shown in Figs. 5 and 6, it will be seen that the nozzles discharge first into the extreme inner portion of the buckets and then that the stream gradually works outward, at which time the next bucket enters into the path of the stream and takes the water. In each and all of the forms, however, the streams project upwardly and enter the buckets, produce impulse effects on the inner portion of each bucket and reactionary effects on the outer portion of each bucket, thereby acting with great efficiency and producing the maximum speed and power to be obtained from the head of water at hand. The nozzles are inclined in the direction of the stream running through the supply-conduit to facilitate the entrance of the water into the nozzles.

Besides the manner in which the water enters the buckets, as stated in connection with Figs. 1, 2, 3, and 4, I would observe that by directing the nozzles so that they would discharge inward across the line in which the dividing edge of the buckets revolve instead of outward across such line, the operation would be that of first entering the sides $b$ of the buckets, then crossing inward over the ridge and supplying both buckets, and finally entering only the inner buckets. The latter remarks apply to the nozzles shown in Figs. 1 and 2 and to the outer series of nozzles shown in Figs. 3 and 4, while the operation in which, because of the inner series of nozzles shown in Figs. 3 and 4, would be the same as that described above for the outer series of nozzles shown in said Figs. 3 and 4.

So far I have described but one form of supply-conduit.

Referring now to Figs. 7 and 8, it will be seen that the conduit E is provided with horizontal partitions E' and E'', dividing the conduit into sub-passages F', F'', and F'''. Each sub-passage feeds one or more nozzles. By means of a cut-off G', operated by a hand-screw H' working in a threaded lug I' on the gate, I admit the water to one or more of the sub-passages, so that any or all of them may be used at a time, according to the quantity of water at hand and the power required for the particular work to be done. This form of supply-conduit operating in conjunction with my improved hurdy-gurdy wheel enables the user to adapt the wheel to every possible practical condition arising in daily use.

I have referred to the wheel as of disk form, but it is obvious that the disk may be divided up into spokes or may be made more or less open, as distinguished from an unbroken plate, and the term "disk" includes this.

Having thus fully described my invention, what I claim as new, and desire to secure by Letters Patent, is—

1. In a hurdy gurdy water wheel, the combination with a horizontal wheel proper having buckets which discharge laterally, of one or more nozzles in a lower plane than the buckets and discharging into them.

2. In a hurdy gurdy water wheel, the combination with a horizontal wheel proper having buckets on its lower side which discharge laterally, of one or more nozzles in a lower plane than the buckets which discharge into them.

3. In a hurdy gurdy water wheel, the combination with a horizontal wheel proper having buckets on the lower side constructed to discharge laterally and a curved inner body portion, of a circular supply conduit under the buckets, and a series of nozzles projecting upward from the conduit and discharging into the buckets.

4. In a hurdy gurdy water wheel, the combination with a horizontal wheel proper, and buckets having their sides and bottom merging into one another so as to discharge laterally, and their upper and lower sides inclined to a horizontal, and nozzles inclined at substantially the same angle as said upper and lower sides.

5. In a hurdy gurdy water wheel, the combination with a horizontal wheel proper and buckets in double circular series, the meeting sides of each two buckets forming a water dividing edge, the sides of the buckets blending with the bottom to discharge laterally, and the upper and the lower sides of the buckets and the dividing edge being inclined, of a series of nozzles under the buckets and inclined upward toward them with their axes substantially in line with said incline of the upper and lower sides and substantially perpendicular to said water dividing edge.

6. In a hurdy gurdy water wheel, the combination with the horizontal wheel proper having buckets on the lower side in double circular series, which discharge laterally of a supply conduit beneath the buckets and a double circular series of nozzles discharging into the double series of buckets.

7. In a hurdy gurdy water wheel, a wheel proper having buckets adapted to take water from nozzles, of a circular conduit, a number of approximately horizontal partitions dividing the conduit into sub-passages, one or more nozzles arranged to discharge into said buckets and to be supplied by each sub-passage and a gate or cut-off with means to operate it to admit water to one or more of the sub-passages.

In testimony whereof I affix my signature in presence of two witnesses.

FRANCIS M. BOOKWALTER.

Witnesses:
HORATIO J. FORGY,
W. M. McNAIR.